United States Patent [19]

Fromm

[11] 4,322,979
[45] Apr. 6, 1982

[54] OPTICAL DEVICE FOR MEASURING SLIGHT DIFFERENCES OF PRESSURE BY MEANS OF A CHANGE IN LIGHT INTENSITY

[75] Inventor: Ingrid Fromm, Munich, Fed. Rep. of Germany

[73] Assignee: Siemens Aktiengesellschaft, Berlin & Munich, Fed. Rep. of Germany

[21] Appl. No.: 181,696

[22] Filed: Aug. 27, 1980

[30] Foreign Application Priority Data

Sep. 17, 1979 [DE] Fed. Rep. of Germany ....... 2937484

[51] Int. Cl.³ ............................................... G01L 9/00
[52] U.S. Cl. ...................................... 73/705; 73/723; 350/485
[58] Field of Search ............... 73/705, 723; 350/96.19, 350/485; 356/376

[56] References Cited

U.S. PATENT DOCUMENTS 3,122,922 3/1964 Kramer ................................. 73/705
3,273,447 9/1966 Frank ................................... 73/705
3,503,116 3/1970 Strack ................................... 73/705

*Primary Examiner*—Donald O. Woodiel
*Attorney, Agent, or Firm*—Hill, Van Santen, Steadman, Chiara & Simpson

[57] ABSTRACT

An optical device for measuring slight pressure differences by means of a light intensity change characterized by a membrane extending across a recess of a housing part to form a first chamber of a first volume which is isolated from a second chamber on the opposite side of the membrane, a right angle isosceles glass prism mounted in the recess with a hypotenuse surface facing said membrane and extending parallel thereto, an input optical waveguide coupled to one short side surface of the prism extending to the light source of a given light intensity for coupling light from said source into the prism and an output optical waveguide being coupled to the other short side surface of the prism for output coupling light from the prism to a measuring device. The surface of the membrane opposite the hypotenuse surface is a light receiving surface such as either by absorbing light or being permeable to light and the membrane surface with the membrane in an idle condition is spaced at an interval such as not greater than the wavelength of the light being used so that approximately 50% of the coupled in light intensity is totally reflected by the hypotenuse surface. Changes in the position of the membrane will cause changes in the intensity which can be measured to determine the pressure differences.

10 Claims, 6 Drawing Figures

OPTICAL DEVICE FOR MEASURING SLIGHT DIFFERENCES OF PRESSURE BY MEANS OF A CHANGE IN LIGHT INTENSITY

BACKGROUND OF THE INVENTION

The present invention is directed to an optical device for measuring slight pressure differences by means of a change of light intensity.

Up to now, measurement of a pressure difference essentially occurs by means of a manometer in which the movement of a membrane is directly employed to actuate a display device and/or a controlled mechanism. In addition to the pressure measuring devices, which are equipped with a membrane, pressure-measuring devices are known which devices function in accordance to a piezo-ceramic principle. Pressure measuring devices, functioning according to the principle of a membrane deflection, share a common fact that the measured force must be mechanically and directly transmitted and thus their sensitivity is not sufficient for a few specific uses, in particular the measurement of slight pressure differences.

SUMMARY OF THE INVENTION

The object of the present invention is to create an optical device for measuring slight pressure differences in which a direct sampling of the measuring force is not required.

To accomplish this task, the optical device comprises a housing part having a recess; a membrane secured on said housing part to extend across said recess to form a first chamber of a first volume; a protective cap engaging the other surface of said membrane and forming a second chamber of a second volume opposite said first chamber; said housing part including means for communicating the first chamber with an atmosphere of a desired pressure; a right angle isosceles glass prism being mounted in said recess with the hypotenuse surface facing said membrane and being parallel thereto; an input optical waveguide, such as glass fiber, being coupled either directly or through a gradient lens to one short side surface of said prism and extending to a light source, which may be either a coherent or an incoherent light source of a given intensity for coupling light from said source into said prism; an output optical waveguide, such as an optical glass fiber being coupled either directly to or through an output gradient lens to the other short side surface of the prism for output coupling light from said prism; a surface of the membrane opposite said hypotenuse surface being a light receiving surface, which either absorbs light or is permeable thereto, said membrane surface with the membrane in an idle condition being spaced at an interval so that approximately 50% of the coupled in light intensity is totally reflected by the hypotenuse surface; and means for measuring light intensity being connected to the free end of the output waveguide so that changes in the pressure in the second chamber relative to the pressure in the first chamber cause a deflection of the membrane to vary the optical light intensity being received by the means for measuring.

The membrane surface may be a hypotenuse surface of a second right angle isoscelse prism which is mounted on the membrane with the hypotenuse surface facing the hypotenuse surface of the prism mounted on the housing part. Preferably, at the rest position, the two surfaces are spaced apart a distance not greater than the wavelength of the light being used.

The invention is based on the fact that in a controlled situation, a light, which is supplied to a short side surface of a right angle isosceles glass prism, is totally reflected at the hypotenuse so that it can be coupled out on the other short side surface of the prism practically without any loss and that when a light permeable or a light absorbing surface approaches the hypotenuse surface of the glass prism, a portion of the light intensity will be coupled out through the gap between the hypotenuse surface of the prism and this body surface on the basis of a known tunnel effect. The light intensity coupled out in such a manner will increase with a decreasing interval between the two surfaces. With contact of the two surfaces in the ideal case, the entire light power coupled into the first short side surface is coupled out through the hypotenuse surface. Accordingly it is thus possible to control the radiant power or intensity which is either allowed to pass through or totally reflected by the hypotenuse surface as the interval between the two surfaces changes.

The invention offers the advantage that pressure differences of a slight magnitude are measurable. Beyond that the advantage is given that the relatively quick change in pressure can be measured due to the slight mass inertia of the optical device because the membrane is the only moving part. For example, measurements of acoustical pressures can be advantageously undertaken.

By positioning the device in a partition between two volumes under pressure, the device can be used to determine relative pressure changes between the two volumes. By providing a gas tight seal in the means to communicate, a fixed or predetermined pressure can be isolated in the first chamber and changes in the pressure of the second chamber relative to the first can be determined.

DESCRIPTION OF THE PREFERRED EMBODIMENTS

Figure 4:
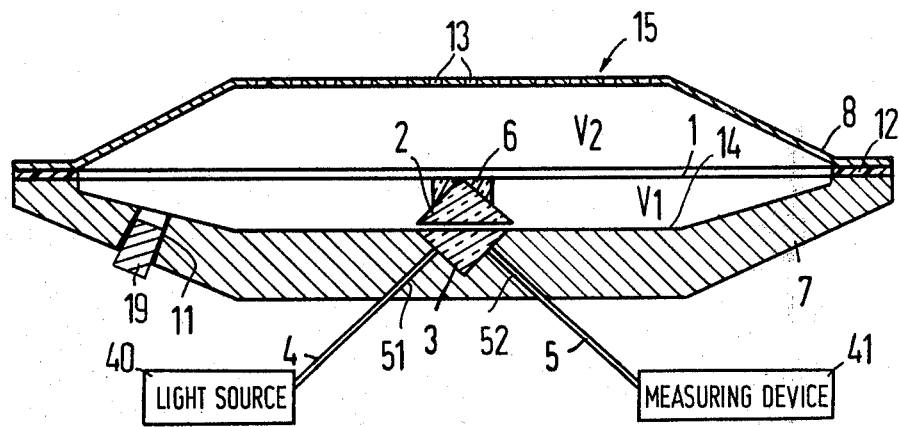
FIG. 4 is a cross-sectional view of an embodiment of the device in accordance with the present invention.

The principles of the present invention are particularly useful in an optical device generally indicated at 15 in FIG. 4.

As illustrated, the device 15 has a housing part 7 having a recess 14, which receives a right angle isosceles glass prism 3. A second right isosceles glass prism 2 is mounted by a prism mount 6 on a membrane 1 which has its outer periphery sealed in an elastic silicon ring 12 which is secured on the periphery of the member 7 to define a first chamber $V_1$ so that the prism 2 lies directly opposite the prism 3. A protective cap 8, which has openings 13, engages the other side of the silicon seal 12 to form a second chamber $V_2$ opposite the chamber $V_1$.

The housing part 7 includes means for communicating the first chamber $V_1$ which means is an aperture 11.

Figure 1:
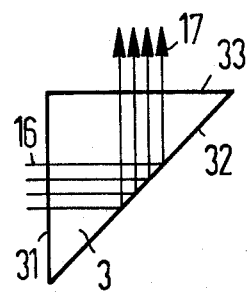
FIG. 1 is a schematic illustration of a right angle isosceles glass prism illustrating its light properties.
Figure 2:
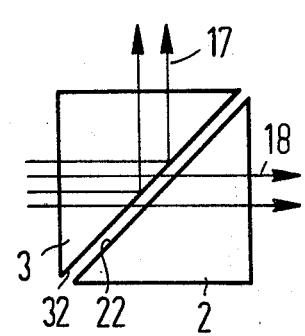
FIG. 2 is a schematic illustration of two isosceles glass prisms with an interval therebetween.
Figure 3:
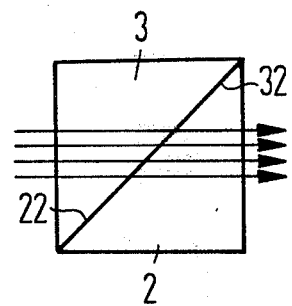
FIG. 3 is two right angle isosceles prisms with contacting surfaces.

If a prism 3 (FIG. 1) has light beams 16 being coupled in a short side surface 31, these light beams will be totally reflected by the hypotenuse surface 32 to pass out the other short side surface 33 as a beam 17. The light beam 17 exiting the surface 33 will be practically of the same intensity as the light beam 16 being coupled into the side surface 31. If a second glass prism 2, (FIG. 2) which is also a right angle isosceles glass prism, is positioned with its hypotenuse 22 extending parallel and spaced from the hypotenuse surface 32, a portion 18 of the beam 16 will be coupled into the additional or second prism 2 as the remaining beams 17 are reflected. This is due to a so-called tunnel effect. As the interval between the two prisms 3 and 2 decreases so that their hypotenuse surfaces come into contact with each other, an ideal case with 100% coupling of the light beams 16 into the prism 2 will occur (FIG. 3).

In the embodiment 15, light is coupled from a light source 40 by a waveguide 4 which may be an optical glass fiber to a short side surface of the prism 3. The light reflected by the hypotenuse surface is output coupled by a waveguide 5 which also may be an optical glass fiber to a measuring device 41.

With the membrane 1 in an idle position, the hypotenuse of the prism 2 is spaced from the hypotenuse surface of the prism 3 at a given distance. When the membrane is deflected by a pressure influence, this deflection is transferred to move the hypotenuse of the glass prism 2 either toward or away from the hypotenuse of the prism 3 to change the interval therebetween. In accordance with the amount of change in the interval between the two hypotenuse surfaces, a part of the light intensity coupled into the prism 3 will be coupled out into the waveguide 5 with the remaining passing or being coupled into the prism 2. Preferably the first chamber $V_1$ has a first volume which is isolated in terms of pressure with respect to the environment by a plug 19 with a gas tight seal being inserted in the aperture 11 of the means for communicating. In order to set a predetermined idle position of the membrane 1 and thus a predetermined interval between the hypotenuse surfaces of the prisms 2 and 3, for a predetermined or means pressure in the second chamber $V_2$, the first chamber $V_1$ is placed under a reference pressure by means of an auxillary means. This reference pressure is then sealed in the chamber 1 by sealing the hole or aperture 11. An interval between the two hypotenuse surfaces is preferably selected so that while the membrane is in the idle position approximately 50% of the light intensity being coupled into the prism 3 will be coupled out along the waveguide 5. Thus, if the pressure in the chamber $V_2$ drops from the predetermined pressure, the membrane will move to increase the interval between the hypotenuse surfaces of the two prisms 2 and 3 and thus increase the amount of light being coupled out through the waveguide 5. In a similar manner, if the pressure increases in the chamber $V_2$ over the predetermined pressure in chamber $V_1$, then the membrane will flex to move the two hypotenuse surfaces towards each other to decrease the interval to decrease the amount of light intensity coupled out by the waveguide 5.

Figure 5:
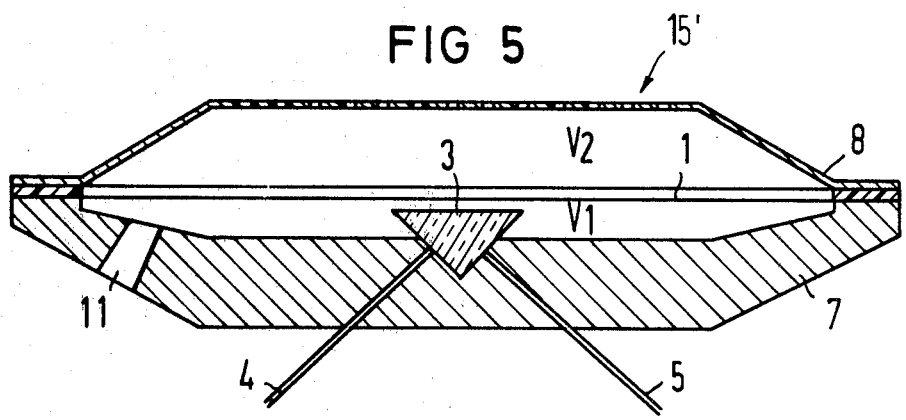
FIG. 5 is a cross-sectional view of a second embodiment of the device of the present invention.

In the embodiment 15' of FIG. 5, the additional or second glass prism 2 is eliminated. In this embodiment, a membrane surface of the membrane 1 facing the glass prism 3 is a light receiving surface, such as being either light permeable or light absorbing, at least in the area of the hypotenuse surface of the prism 3. Other than these changes, the embodiment of the device 15' is similar to the embodiment of the device 15 of FIG. 2.

Figure 6:
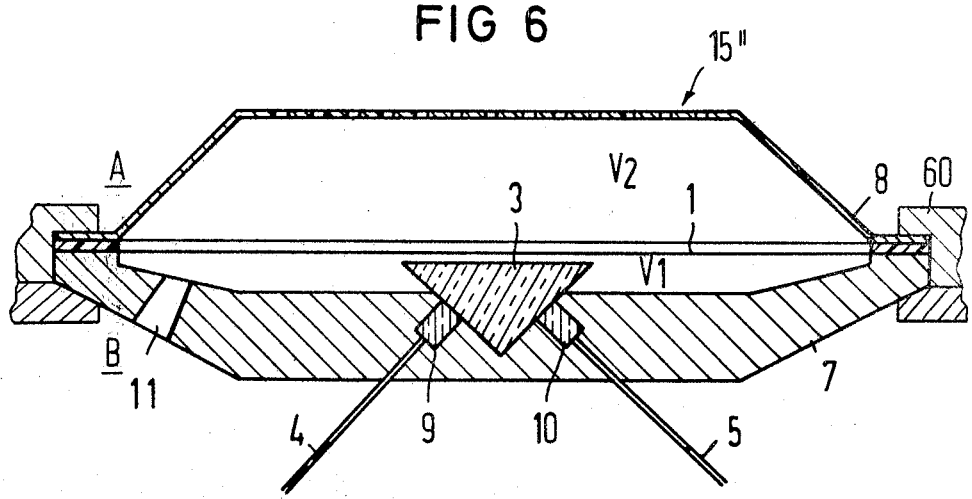
FIG. 6 is a cross-sectional view of a third embodiment of the present invention mounted in a partition.

Another embodiment 15" is illustrated in FIG. 6. In this embodiment, the optical fiber forming the waveguide 4 and the optical fiber forming the output waveguide 5 are not directly connected to the respective allocated short side surfaces of the prism 3. Instead, the optical waveguide 4, which is an optical fiber is connected by a gradient lens 9 to the surface of the prism 3 while the output waveguide 5, which is an optical fiber, is connected by an output gradient lens 10 to the respective short side surface.

In the embodiment such as 15, 15' and 15" in order to aid in positioning the waveguides 4 and 5, with respect to each other and with respect to their specific short side surface, the housing part 7 may be provided with guidance grooves such as the grooves 51 and 52 illustrated in FIG. 4.

As previously described, the pressure of the gas in the chamber $V_1$ was of a predetermined pressure so that atmospheric pressures entering openings such as 13 in the cap 8 would change the pressure in the chamber $V_2$. It is also possible to remove the seal or plug 19 in the aperture 11 so that the chamber $V_1$ is also in communication with some outside or external source of pressure. Thus, the unit such as 15, 15' and 15" may be mounted in a partitions such as 60 (see FIG. 6) between two separate volumes A and B so that a pressure differential between the two different volumes A and B can be determined.

A particular advantage of the optical device is its great sensitivity. Since the percentage of the total reflected light function is from zero to 100% for a deflection in the magnitude of the light wavelength, only small membrane deflections are required. An increase in the sensitivity can be achieved by either using thinner membranes or a light with shorter wavelengths. The small dynamic range, which results, can be enlarged when one again proceeds from a zero position by mean of pressure compensations between the chambers $V_1$ and $V_2$.

The light source 40 can advantageously utilize an incoherent light source such as a light emitting diode (LED). It is also desirable to use a coherent light source such as the laser diode.

Although various minor modifications may be suggested by those versed in the art, it should be understood that I wish to embody within the scope of the patent granted hereon, all such modifications as reasonably and properly come within the scope of my contribution to the art.

I claim:

1. An optical device for measuring slight pressure differences by means of a light intensity change, said device comprising a housing part having a recess; a membrane secured on said housing part to extend across said recess to form a first chamber of a first volume; a protective cap engaging the other surface of said member and forming a second chamber of a second volume opposite said first chamber, said housing part including means for communicating the first chamber with an atmosphere of desired pressure; a right angle isosceles glass prism being mounted in said recess with the hypotenuse surface facing said membrane and extending parallel thereto; an input optical waveguide being coupled to one short side surface of said prism and extending to a light source of a given light intensity for coupling light from said source into said prism; an output optical waveguide being coupled to the other short side surface of the prism for output coupling light from said prism; a surface of the membrane opposite said hypotenuse surface being a light receiving surface, said membrane surface with the membrane in an idle condition being spaced at an interval so that approximately 50% of the coupled in light intensity is totally reflected by the hypotenuse surface; and means for measuring the light intensity being connected to the free end of the output waveguide, so that changes in the pressure in the second chamber relative to the pressure in the first chamber cause a deflection of said membrane to vary the optical light intensity being received by the means for measuring.

2. An optical device according to claim 1, wherein the means for comminicating includes a gas tight seal to enable isolating and sealing predetermined pressure in said first chamber.

3. An optical device according to claim 1, wherein the input optical waveguide is an optical fiber directly connected to the short side surface of the glass prism and the output optical waveguide is an optical fiber directly connected to the other short side surface.

4. An optical device according to claim 1, wherein the input optical waveguide is an optical fiber connected by an input gradient lens to the short side surface of the prism and the output optical waveguide is an optical fiber connected by an output gradient lens to the other short side surface of the prism.

5. An optical device according to claim 1, wherein the membrane is seated at its edges in an elastic silicon ring, said housing part being secured to said silicon ring.

6. An optical device according to claim 1, wherein each of the input optical waveguides and the ouptut optical waveguides are fiber waveguides and said housing part has guide grooves to aid in positioning each fiber waveguide in an optimum relative position with respect to its respective short side surface of the prism.

7. An optical device according to claim 1, wherein said device is mounted in a partition between two volumes under pressure and said means for communicating allows the first chamber to be in communication with one volume as one side of said partition so that said device determines relative pressure changes between said volumes.

8. An optical device according to claim 1, wherein the input waveguide is an input fiber optical waveguide and said light source is a laser diode connected to said fiber waveguide.

9. An optical device according to claim 1, wherein the light source is an incoherent light source preferably a light emitting diode.

10. An optical device according to claim 1, wherein the membrane surface is a hypotenuse surface of a second right angle isosceles glass prism, said second glass prism being secured on said membrane by a prism mount and the interval between the hypotenuse surface of the second glass prism and the first mentioned glass prism while the membrane is at rest is not greater than a wave length of the light being coupled into the first mentioned prism.

* * * * *